United States Patent [19]

Wang et al.

[11] Patent Number: 6,072,001

[45] Date of Patent: Jun. 6, 2000

[54] LONG-TERM ANTISTATIC COMPOSITION

[75] Inventors: Hsin-Herng Wang, Hsinchu; Bin-Yuan Lin, Hsinchu Hsien, both of Taiwan

[73] Assignee: Industrial Technology Research Institute, Hsinchu, Taiwan

[21] Appl. No.: 09/013,897

[22] Filed: Jan. 27, 1998

[30] Foreign Application Priority Data

Dec. 26, 1997 [TW] Taiwan ................................. 86119805

[51] Int. Cl.$^7$ ......................... C08G 63/48; C08G 63/91; C08L 51/08; C08L 75/00; C08L 77/00

[52] U.S. Cl. ................................ 525/66; 525/63; 525/69; 525/179; 525/183; 525/184; 525/100; 525/101; 525/104

[58] Field of Search .................................. 525/66, 69, 63, 525/179, 183, 184, 100, 101, 104

[56] References Cited

U.S. PATENT DOCUMENTS 3,475,898  11/1969  Magat et al. ............................ 161/174

*Primary Examiner*—Patrick D. Niland
*Attorney, Agent, or Firm*—Sughrue, Mion, Zinn, Macpeak & Seas, PLLC

[57] ABSTRACT

The present invention uses high molecular weight polyethene glycol copolymer with high antistatic property, and other solubilizer agent to proceed blending and enhancing the co-solublization property of the polyamide. The long-term antistatic plastic particles obtained by blending the modified antistatic composition and the polyamide material are made into different articles according to various composites. The molded articles are divided into three types: (1) an antistatic polyamide article with surface resistance of about $10^{10}$–$10^{11}$ ($\Omega$/sq.), and the dissipation time of electrostatic charge is less than 1.5 sec; (2) an antistatic polyamide fiber with surface resistance of about $6\times10^{10}$–$1.2\times10^{12}$ ($\Omega$/sq.), and the dissipation time of electrostatic charge is less than 60 sec; (3) a polishing resistant antistatic polyamide with surface resistance of about $10^{10}$–$10^{11}$ ($\Omega$/sq.), and the dissipation time of electrostatic charge is less than 1.5 sec.

8 Claims, No Drawings

LONG-TERM ANTISTATIC COMPOSITION

FIELD OF THE INVENTION

This invention relates to an antistatic composition. In particular, it relates to a long-term antistatic composition.

BACKGROUND

This invention relates to an antistatic composition. In particular, it relates to a long-term antistatic composition.

The conventional antistatic products are fabricated by adding antistatic agent and using the conductive fillers like carbon black, conductive metal fiber, metal powder, or china powder to enhance their effective antistatic properties. The products described above have the advantages of being low-cost and having high-conductivity; however, the products are colorless and hard to dye. In addition, the products can not be spun, and the dust produced during the manufacturing process is distributed widely, resulting in serious air pollution and migration of the molded products (which is forbidden in a highly clean environment). Additionally, the antistatic products fabricated according to the methods described above generally have the disadvantages of being poor in color or having short-term antistatic properties. Moreover, the low M. W. ethylene oxide, or a compound with the functional group of ethylene glycol such as polyethylene glycol (PEG) or polyethylene oxide (PEO) or their copolymer (M. W.<30000), is added as an antistatic agent to provide the products with the original resin color or dyeing ability. However, the drawbacks such products can be described as following: (a) the antistatic property of the molded products appears 24–72 hours after production; (b) cost are high; (c) the electrostatic charge has a brief dissipation time; and (d) the resistance of such products to water-washing is poor.

One antistatic fiber is disclosed in U.S. Pat. No. 3,475,898, wherein 3~15% by weight of an antistatic agent (possessing at least two hydroxyl group), for example olefin ether, with molecular weight more than 1000~30,000, is added to the polyamide. Then one fiber, with a diameter of about 0.05~1.5 μm and a length of about 15 μm is obtained after spinning to make an antistatic agent distribute along the longitude direction of fibers. The drawback of the antistatic fiber fabricated according to this invention described above is that the molecular weight of the antistatic reagent is much less than usually; in addition, the electrostatic charge has a very brief dissipation time, and washing-resistance is poor.

Another method for manufacturing a modified antistatic high molecular weight fiber and woven is disclosed in U.S. Pat. No. 5,364,582, wherein 0.8~2.5% by weight of low molecular weight amino olefin is added as an antistatic reagent to enhance the antistatic property, ultraviolet light resistance, dyeing ability and uptake properties of dyes. However, when this method is used, the physical properties of the fiber and the dissipation time of electrostatic charge are both poor.

One conventional conductive complex fiber fabricated by adding more than 30% by weight of Pyrol Polymer to enhance the conductive property of polyamide is disclosed in Japan TaiKo Patent No 4-65581; however, the product fabricated by this invention are darker in color and have poor physical properties.

Another conventional thermoplastic polyamide/polyether thin film is disclosed in EPO patent No.476895A2, wherein about 5~95% by weight of conductive thermoplastic polyamide/polyether copolymer, 40% by weight of polyamide and 1~5% by weight of ionomer are blend, then a thin film for package material is obtained by extrusion. The drawback of this thin film fabricated by this invention is that large amount of antistatic reagent is required which results in much higher costs.

Avoiding the drawbacks of the conventional antistatic material described above, this present invention provides a long-term antistatic composition using modified mold controlled techniques to develop an article with long-term antistatic, water-washing resistant and solvent-washing resistant properties.

SUMMARY OF THE INVENTION

The present invention is characterized in blending a high molecular weight polyethene glycol antistatic agent with solubilizer to regulate the melt degree and enhance the solubility of polyamide substrate. The antistatic reagent is orientated in the surfaces of the molded articles to form conductive pathways and dissipate static charges by way of designed processing conditions. Maleic anhydride grafted to olefin (hereinafter "maleic anhydride modified polyolefin") is used as the solubilizer of hydrophilic resin and polyamide. The obtained modified polyamide particles can be manufactured into various plastic molded articles, thin plates or fibers by extrusion molding techniques, injection molding techniques and spinning techniques. Adding additives to enhance anti-polishing property will enlarge the potential uses of articles produced according to this invention.

One feature of this invention is that an antistatic composition is produced, wherein about 75~98% by weight of polyamide, about 3~15% by weight of high molecular weight polyethene glycol polymer and about 0.1~5% by weight of maleic anhydride modified polyolefin are comprised. The polyamide comprises at least one copolymer selected from the group consisting of nylon 6, nylon 66, nylon 46, nylon 12, and nylon 6-66. The formula of the high molecular weight polyethene glycol polymer is:

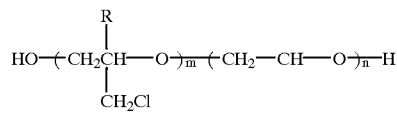

wherein m=300~1200 n=300~1200

R=H, CH$_3$, C$_2$H$_5$ or C$_6$H$_5$.

The maleic anhydride modified polyolefin is selected from one of the group consisting of LDPE, LLPE, HDPE and PPE.

Another feature of this invention is that an antistatic and anti-polishing composition is produced, wherein about about 60~85% by weight of polyamide, about 5~15% by weight of polytetrafloroethene, 1~5% by weight of polysilicon, 1–10% by weight of high molecular weight polyethene glycol polymer and 0.1~10% by weight of maleic anhydride modified polyolefin are comprised. The formula of the polysilicon is:

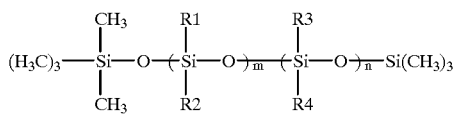

wherein m=300~1200
n=300~1200
R=H, $CH_3$, $C_2H_5$ or $C_6H_5$

The formula of the high molecular weight polyethene glycol polymer is:

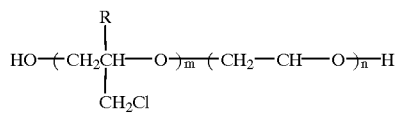

wherein m=300–1200
n=300~1200
R=H, $CH_3$, $C_2H_5$ or $C_6H_5$.

The maleic anhydride modified polyolefin comprises at least one copolymer selected from the group consisting of LDPE, LLPE, HDPE, PPE, and polyethene glycol.

The long-term antistatic materials manufactured by this invention could be applied in the antistatic wovens of staple fiber industry to produce non-dust clothes, surfaces of the conductive shoes, and safe-clothes, or the parts of spinners in the plastic molded industry, or the housings of the copier, the paper tank of the printer, and the antistatic bags of the electric products package industry.

DESCRIPTION OF THIS INVENTION

Embodiment 1

The antistatic agent (high molecular weight polyethene glycol copolymer) and solubilizer agent (maleic anhydride modified polyolefin) are mixed together in a ratio of 10:6, then 100 parts of polyamide compound such as nylon 6 is added to form plastic particles. Then the plastic particles are made into test film by injection molding. The compared results of the pure nylon and the material without adding solubilizer agent are shown in table 1. Viewing from table 1, the mechanical properties of the material fabricated by this invention are superior to those fabricated by pure nylon 6 resin. The polyamide compound comprises at least one copolymer selected from the group consisting of nylon 6, nylon 66, nylon 46, nylon 12, and nylon 6-66. The high molecular weight polyethene glycol polymer is:

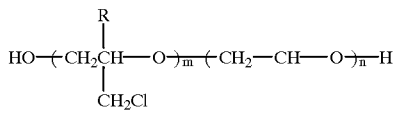

wherein m=300~1200
n=300~1200
R=H, $CH_3$, $C_2H_5$ or $C_6H_5$.

The maleic anhydride modified polyolefin is selected from one of the group consisting of LDPE, LLPE, HDPE, PPE and PEG.

TABLE 1

Comparsion properties of pure nylon 6 and the material of this invention

|  | Pure nylon 6 | Material of this invention | Referential material** |
|---|---|---|---|
| Broken strength (kgf/cm$^2$) | 472 | 715 | 401 |
| Elongation (%) | 5.38 | 294 | 121 |
| Notched Izod impact strength (ft-lb-in) | 0.51 | 2.49 | 1.02 |
| Surface resistance (Ω/sq.) | $1 \times 10^{15}$ | $1.7 \times 10^{10}$ | $3 \times 10^{11}$ |
| Dissipation time of electrostatic charge (sec)* | 20 | 1.36 | 2.1 |

*According to Federal Test Standard 101C, Method rule: 4046.1.
**Referential material refers to the product manufactured without adding solubilizer agent.

Embodiment 2

The test films obtained from embodiment 1 are impregnated with de-ion water and isopropane respectively under 25° C. and 60° C. for 30 days. The electric properties are shown in table2.

TABLE 2

Results for test results of water-washing resistance and solvent-washing resistance

| Temp. | Electric properties | Referential materials | | Materials produced according to this invention | |
|---|---|---|---|---|---|
| | | Impregnate with water | Impregnate with isopropane | Impregnate with water | Impregnate with isopropane |
| 25° C. | Surface resistance (Ω/sq.) | $3.01 \times 10^{14}$ | $5.20 \times 10^{14}$ | $2.01 \times 10^{14}$ | $2.30 \times 10^{14}$ |
| | Dissipation time of electrostatic charge (sec)* | 15 | 17 | 1.41 | 1.42 |
| 60° C. | Surface resistance (Ω/sq.) | $4.70 \times 10^{14}$ | $6.40 \times 10^{14}$ | $2.50 \times 10^{14}$ | $2.55 \times 10^{14}$ |
| | Dissipation time of electrostatic charge (sec)* | 18 | 19 | 1.45 | 1.46 |

Referring to table 2, the products manufactured by this invention have strong water-washing resistance and solvent-washing resistance. The conventional products manufactured by adding short-term antistatic agents could not retain their antistatic properties over the course of 10 days, and the dissipation time of electrostatic charge of the referential materials was above 20 seconds (after impregnating with water or isopropane).

Embodiment 3

The pure nylon 6 particles and the plastic particles obtained from embodiment 1 are mixed in the same ratio as for embodiment 1, but no solubilizer agent is added.

TABLE 3

Properties of various fibers (fiber thickness: 25 denier)

|  | Nylon 6 fiber | Antistatic agent/ nylon 6 fiber | Nylon 6 fiber/antistatic agent/nylon 6 fiber |
|---|---|---|---|
| Spinning rate (m/min.) | 900 | Could not be spun | 600 |
| Broken strength (g/d) | 3.5~4.0 | — | 2.2~2.5 |
| Elongation (%) | 30~40 | — | 34~40 |
| Surface resistance ($\Omega$/sq.) | >$10^{15}$ | — | $4 \times 10^{11}$~$1.1 \times 10^{12}$ |
| Static leakage time (sec) | >600 | — | 57 |

The results show that the solubilization-modified antistatic polyamide composite has better antistatic properties; moreover, the unmodified antistatic polyamide composite could not be spun.

Embodiment 4

Six parts of antistatic agent, 0.5 part of solubilizer, 10 parts of polytertafloroethene and 1.5 parts of polysilicon are mixed together first, then 82 parts of nylon 12 are blend to manufacture plastic particles. The plastic particles are injection-molded to form test films, wherein the value of surface resistance is about $5 \times 10^{10}$($\Omega$/sq) and the dissipation time of electrostatic charge is about 1.6 sec. Then the polishing resistance is determined according to the method described in ASTM D4060-84 (H18, weight 250 g, 1000 rpm), wherein the lost weight is less than 0.1 g. However, the lost weight of the product with the same ratio composition but without adding anti-polishing modified agent is more than 2 g. The polyamide comprises at least one copolymer selected from the group consisting of nylon 6, nylon 66, nylon 46, nylon 12, nylon 6-66; the formula of the polysilicon is:

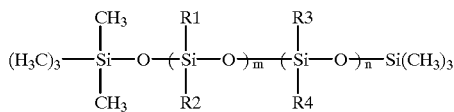

wherein m=300~1200 n=300~1200

R=H, CH$_3$, C$_2$H$_5$ or C$_6$H$_5$.

The formula of the high molecular weight polyethene glycol polymer is:

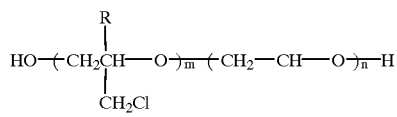

wherein m=300~1200 n=300~1200

R=H, CH$_3$, C$_2$H$_5$ or C$_6$H$_5$

The maleic anhydride modified polyolefin comprises at least one compound selected from the group consisting of low density polyethene (LDPE), linear low density polyethene (LLDPE), high density polyethene (HDPE), polypropene acetic ethyl ester (PPE), and polyethene glycol (PEG).

The solubilizer is added to enhance the co-solubilization of hydrophilic resin and polyamide substrate in this invention. The articles fabricated according to this invention have the following properties:highly antistatic; long-term dispersion time of electrostatic charge; antistatic properties existing immediately after molding, by contrast to those products produced by adding low M. W. PEG or PEO appearing antistatic property 24~72 h later. In addition, products with good antistatic and antipolyshing properties can be obtained by adding polysilicon. Thus the drawbacks of the conventional antistatic articles can be minimized by the use of invention. The long-term antistatic materials manufactured by this invention can be applied to the antistatic wovens of the staple fiber industry to produce non-dust clothes, surfaces of the conductive shoes, and safe-clothes, or to the parts of spinners in the plastic molded industry, or the housings of the copier, the paper tank of the printer, and the antistatic bags of the electric products package industry.

Other Embodiments

All of the features disclosed in this specification may be combined in any combination. An alternative feature serving the same, equivalent, or similar purpose may replace each feature disclosed in this specification. Thus, unless expressly stated otherwise, each feature disclosed is only an example of a generic series of equivalent or similar features.

From the above description, one skilled in this art can easily ascertain the essential characteristics of the present invention, and, without departing from the spirit and scope thereof, can make various changes and modifications of the invention to adapt it to various usages and conditions. Thus, other embodiments are also within the claims.

What is claimed:

1. An antistatic composition comprising:
   about 75–98% by weight of polyamide;
   about 3~15% by weight of a high molecular weight polyethene glycol polymer having a number average molecular weight from at least 40,818 to 254,418; and
   about 0.1–5% by weight of maleic anhydide modified polyolefin.

2. The composition of claim 1, wherein the polyamide comprises at least one copolymer selected from the group consisting of nylon 6, nylon 66, nylon 46, nylon 12, and nylon 6-66.

3. The composition of claim 1, wherein the formula of the high molecular weight polyethene glycol series polymer is:

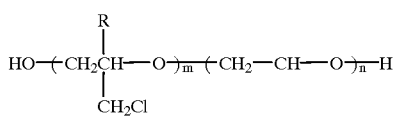

wherein m=300~1200 n=300~1200

R=H, CH$_3$, C$_2$H$_5$ or C$_6$H$_5$.

4. The composition of claim 1, wherein the maleic anhydride modified polyolefin is at least one selected from the group consisting of LDPE, LLDPE, HDPE, PPE, and PEG.

5. An antistatic and anti-polishing composite comprising:
about 60~85% by weight of polyamide;
about 5~15% by weight of polytetrafloroethene;
about 1~5% by weight of polysilicon;
about 1~10% by weight of a high molecular weight polyethene glycol polymer having a number average molecular weight from at least 40,818 to 254,418; and
about 0.1~10% by weight of maleic anhydride modified polyolefin.

6. The composition of claim 5, wherein the formula of the polysilicon is:

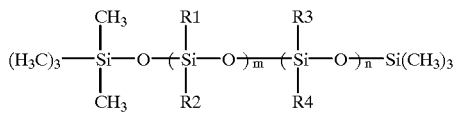

wherein m=300~1200
n=300~1200
R=H, $CH_3$, $C_2H_5$ or $C_6H_5$.

7. The composition of claim 5, wherein the formula of the high molecular weight polyethene glycol series polymer is:

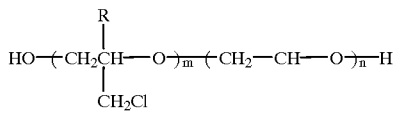

wherein m=300~1200
n=300~1200
R=H, $CH_3$, $C_2H_5$ or $C_6H_5$.

8. The composition of claim 5, wherein the maleic anhydride modified polyolefin comprises at least one copolymer selected from the group consisting of LDPE, LLDPE, HDPE, PPE, and PEG.

* * * * *